May 4, 1954 — R. A. OSWALD — 2,677,305
MEANS OF PHOTOGRAPHING RACING EVENTS
Filed Dec. 21, 1949 — 9 Sheets-Sheet 2
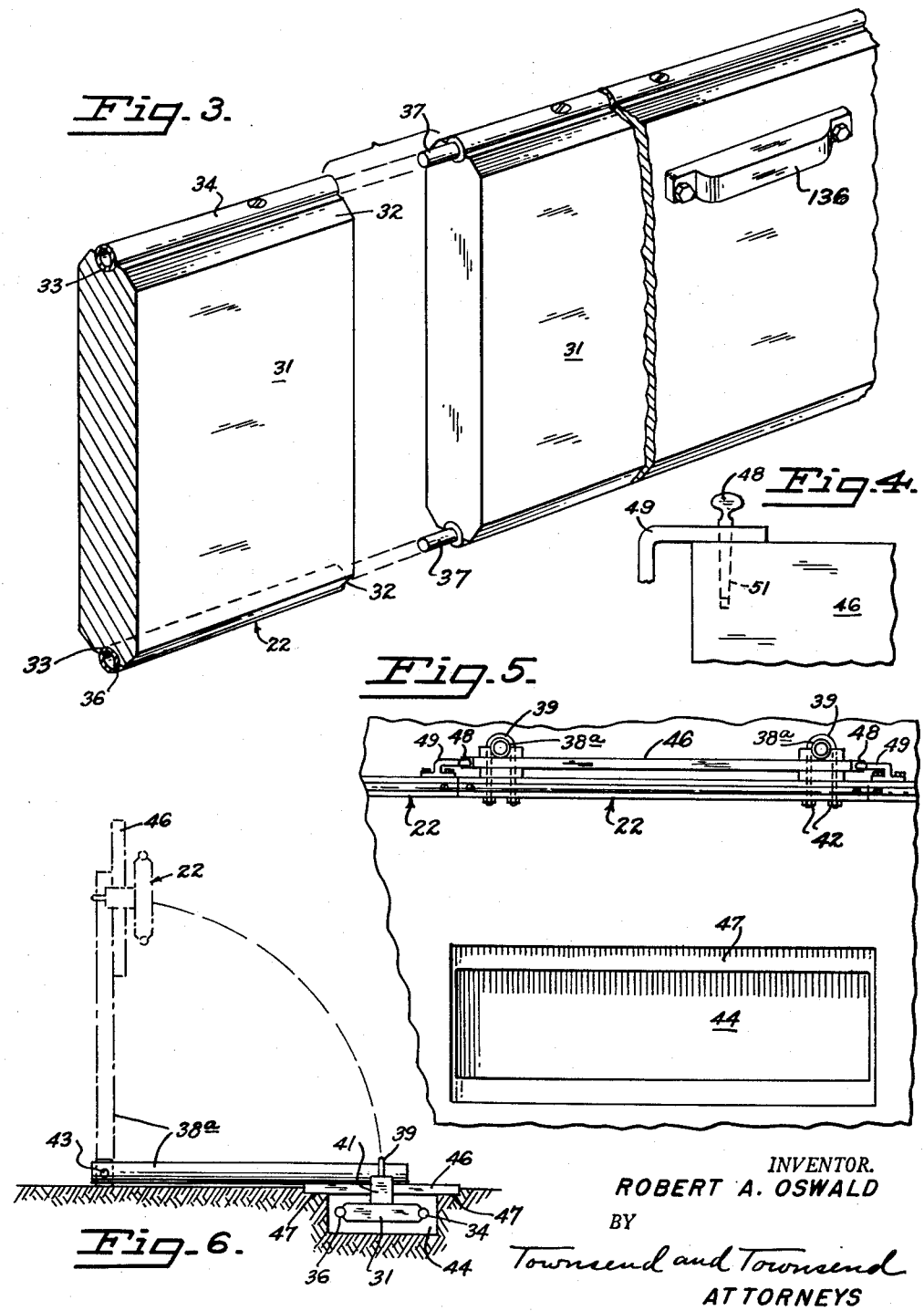
INVENTOR.
ROBERT A. OSWALD
BY
Townsend and Townsend
ATTORNEYS

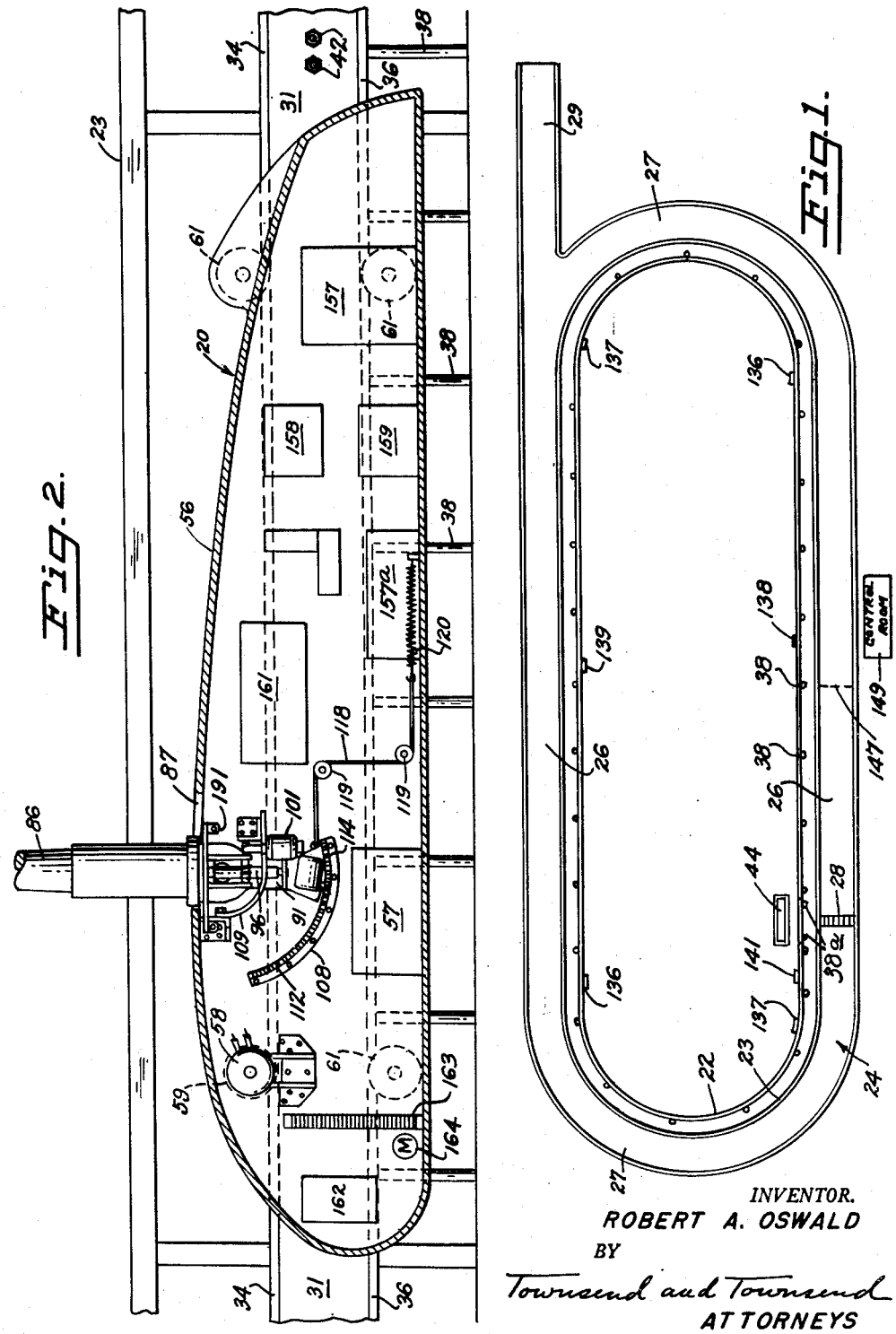

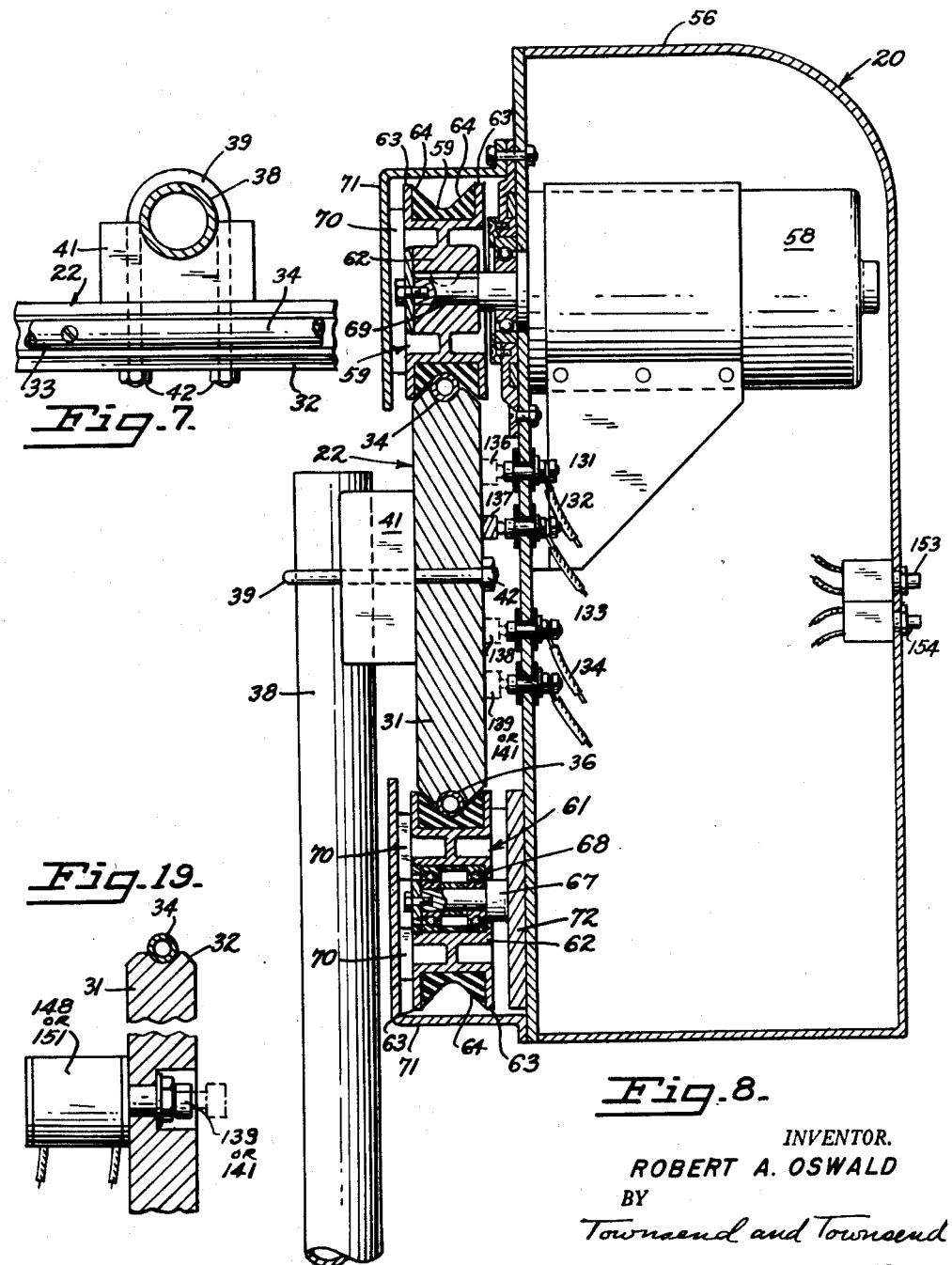

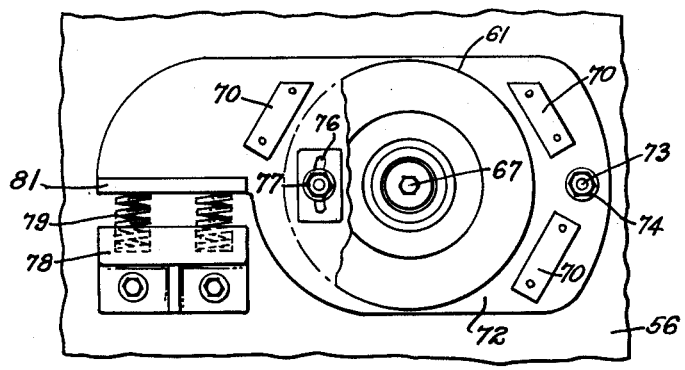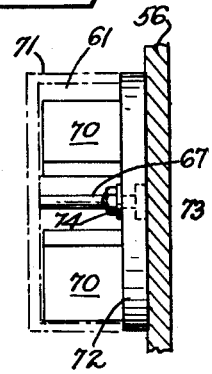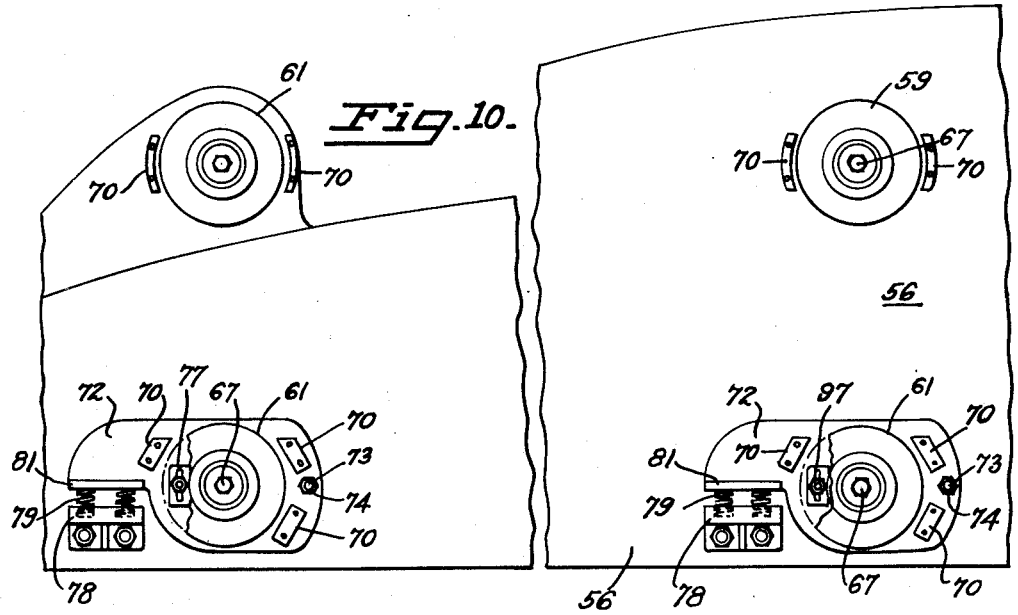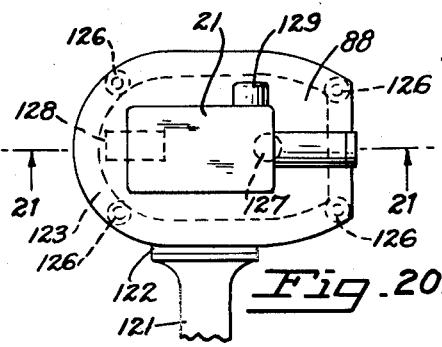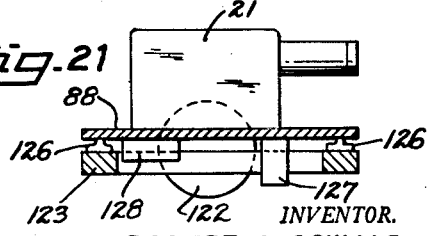

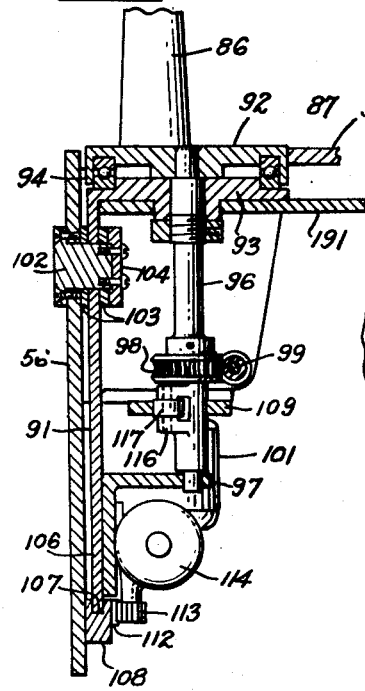
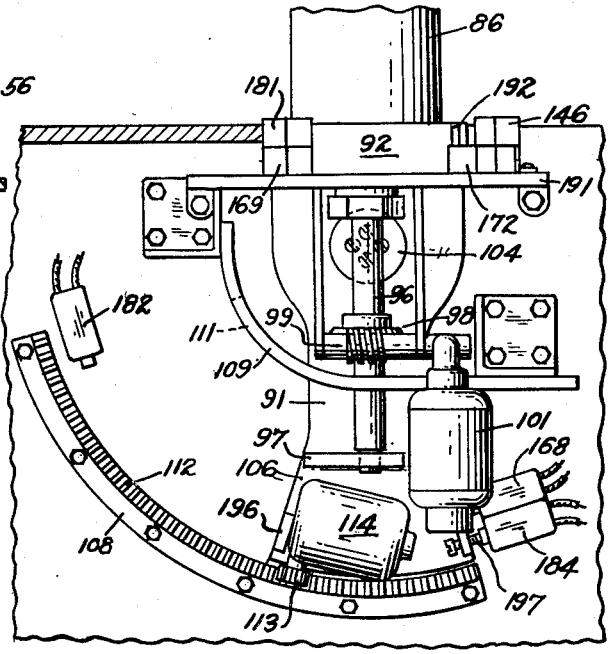
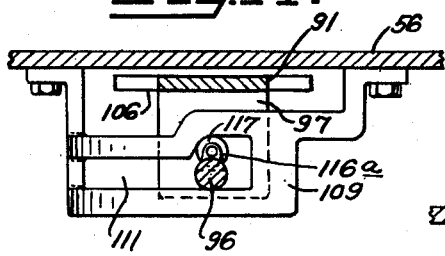
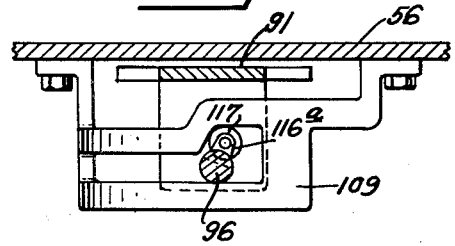
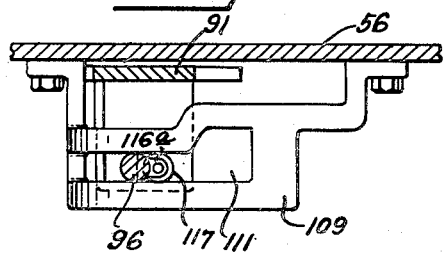
INVENTOR.
ROBERT A. OSWALD
BY
Townsend and Townsend
ATTORNEYS

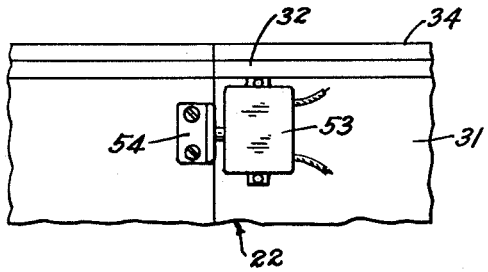
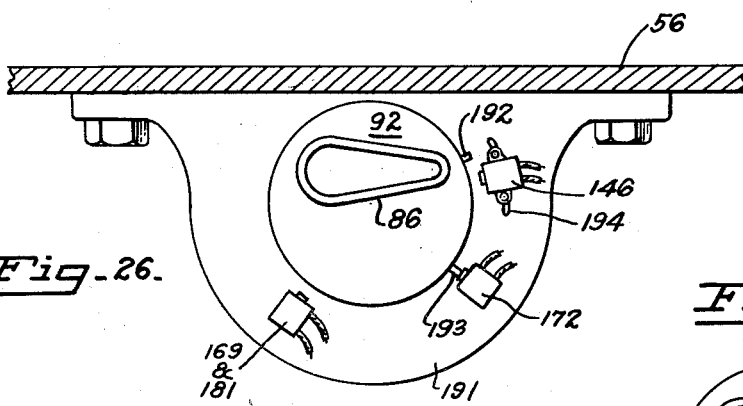
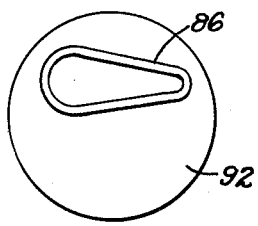
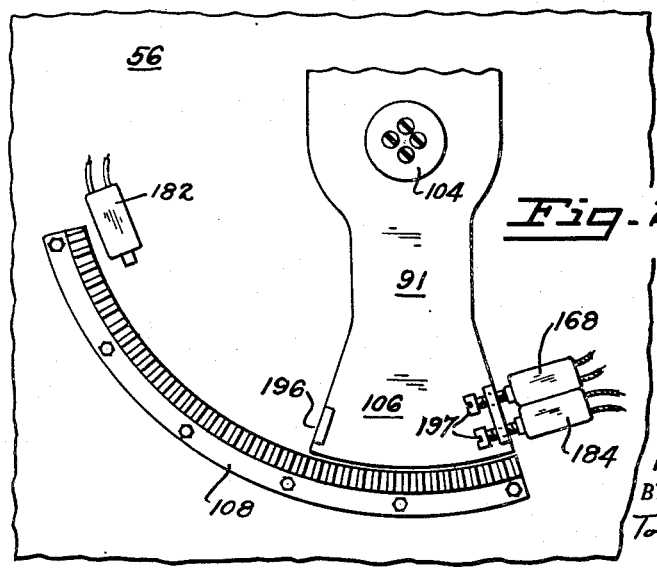

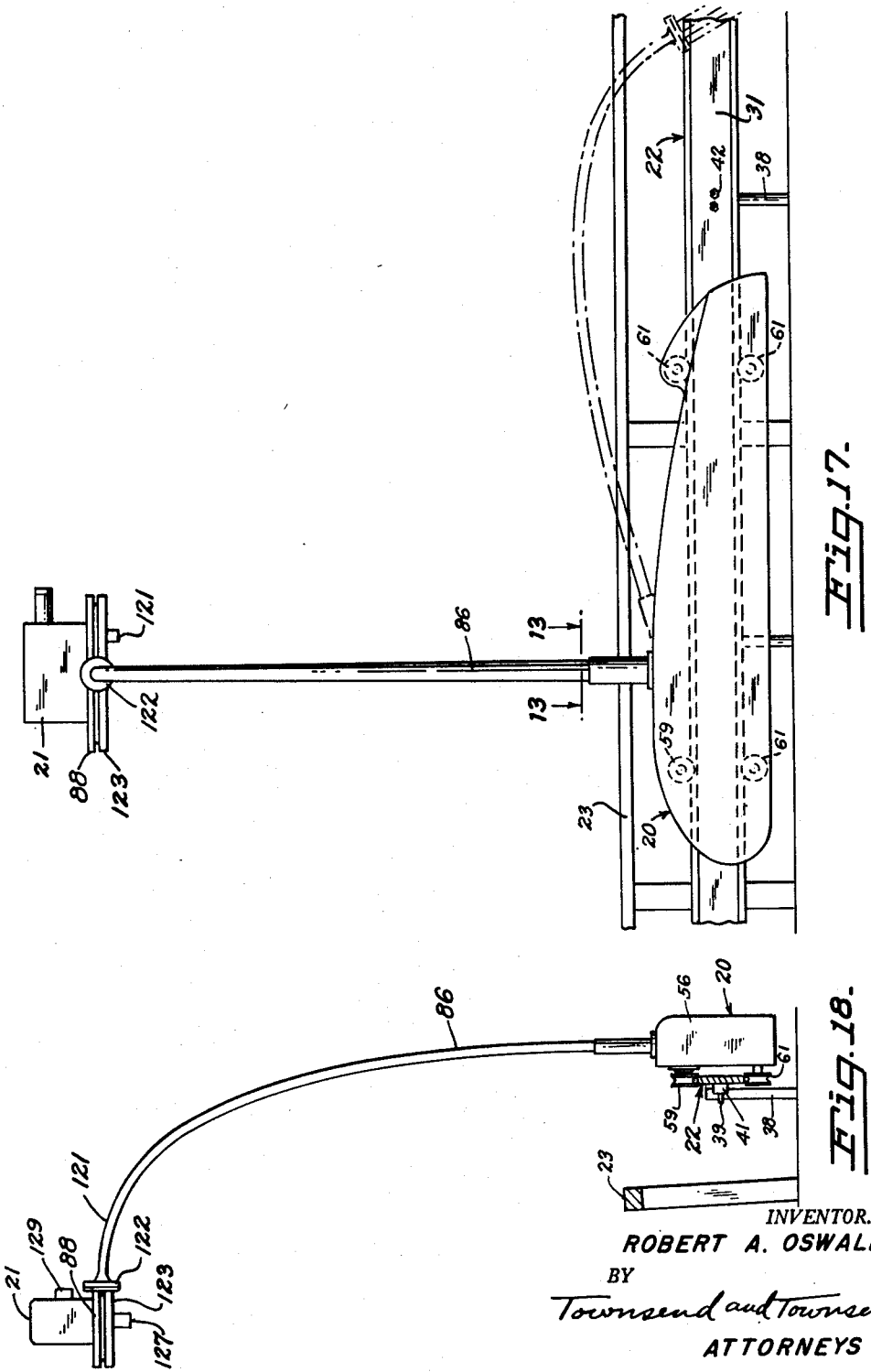

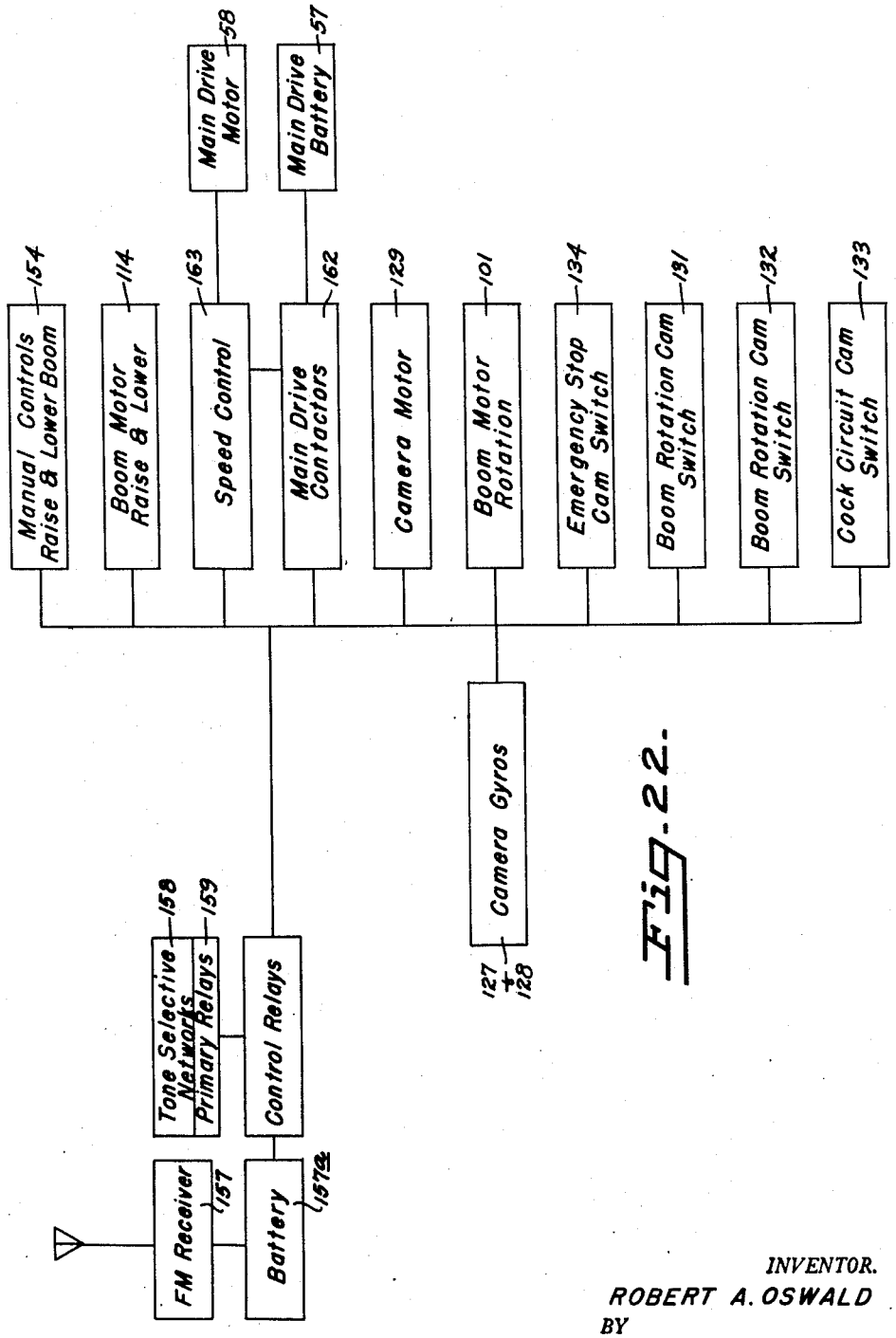

INVENTOR.
ROBERT A. OSWALD
BY
Townsend and Townsend
ATTORNEY

Patented May 4, 1954

2,677,305

UNITED STATES PATENT OFFICE 2,677,305

MEANS OF PHOTOGRAPHING RACING EVENTS

Robert A. Oswald, San Mateo, Calif.

Application December 21, 1949, Serial No. 134,333

11 Claims. (Cl. 88—16)

This invention relates to new and useful improvements in means of photographing racing events.

The present invention is primarily useful in photographing racing events such as horse races in order to obtain a continuous photographic record of the racing contestants from start to finish. The purpose of such a record is to detect fouls and thus to settle disputes, provide evidence with respect to disciplinary action against jockeys, and discourage rough or illegal riding. As a result of certain photographic development processes, it is possible to develop films and project the films on a screen within a very short time after the conclusion of a race and racing officials may view the pictures and speedily determine whether a particular horse should be disqualified for infraction of racing rules. Such a rapid determination is of importance for it enables the track management to pay off on the winning pari mutuel tickets in sufficient time for the successful wagerer to purchase tickets on the next race. Hence the patrons of the track are enabled to more actively participate in the wagering and the total receipts of the track are increased. Such photographic records may also have news or pictorial value.

Basically the invention involves the mounting of a motion picture camera elevated on a boom carried by a car which circles a rail around the track ahead of the horses.

A common method of photographing racing events, in wide use at the present, involves the stationing of cameras and operators at various locations on the track, ordinarily in elevated towers. Such a photographic method is disclosed in U. S. Letters Patent No. 2,382,616 issued to Lorenzo del Riccio, August 14, 1945. The use of such a method has been extremely successful and very useful in regard to the objects heretofore set forth. However, there are several inherent limitations in this method. One limitation is the fact that a certain amount of time is consumed in collecting the exposed film from the various camera stations. This is ordinarily done by a motor vehicle which circles the track and collects from each operator the film exposed in his camera. Since time is of the essence in the operation, a saving of time as contemplated in the present invention is of great importance, and the elimination of the operator of the motor vehicle is a saving in labor cost. A second limitation of the prior method is the fact that although a continuous record of the race is obtained, nevertheless unless a large number of towers is used there are certain stretches of the track where the record is less satisfactory than others. The present invention contemplates a continuous record, the camera travelling with the horses, so to speak, so that the camera is substantially the same distance away from the contestants at all times. Finally, the labor cost involved in stationing a large number of operators of cameras around the track is considerable, and the present invention reduces such labor cost materially.

There are certain problems in connection with the operation of a car-mounted camera which the present invention overcomes. One matter of importance is control. It is obvious that the speed of the moving car must be timed to the speed of the horses. It is also desirable that it be possible to reverse the direction of travel of the car when necessary. Thus one set of the controls of the present invention accomplishes starting, stopping, braking, reversing and governing the speed of the car. Such control is preferably manual and by remote control.

Another desirable remote control device starts and stops the running of film through the camera so as to economize in the exposure of film.

It is further desirable that certain automatic controls be employed, and the present invention incorporates such controls. One of the most important of these is a control which will rotate the boom on which the camera is mounted so that the camera will be directed toward the contestants whether they are on the turns or straightaway portions of the track. It is necessary to rotate the boom for a predetermined angular distance as the car enters a turn, and then restore the boom to its previous position when the car enters the straightaway.

A further feature of the present invention is the use of controls which will lower the boom at certain times when it is desired to remove exposed film and load with unexposed film. Thus, the car should be stopped at a location adjacent the processing laboratory, for loading and unloading, but obviously should not be stopped at such location when the camera passes such point while the race is in progress. It is a feature of the present invention that the boom will lower automatically when the camera is stopped and the motor which drives the car is also stopped upon actuation of certain automatic controls. A further control is provided in a location on the car itself which may be manually operated to raise the boom after loading the camera and also to lower the boom when desired. A safety feature of the invention is that the boom will lower only when the camera boom is rotated so that the lowered boom will not endanger contestants accidentally striking against same.

A further automatic control is a safety device to stop the motion of the car when a section of rail is not properly in place so as to prevent derailment of the car.

An emergency stop manually operated to stop the car when other means fails is also contemplated.

In addition to the foregoing controls, other features of the present invention are advantageous. One of the most important of these is the mounting of the car on a monorail. In order that the pictures obtained be of high quality, there must be a minimum of swaying of the camera and this means that the car must move along its track smoothly. The monorail construction and means for mounting the car on the rail as hereinafter described result in a smooth operation so that the camera is not subjected to violent movement or vibrations. The camera is shock-mounted on the boom and is further stabilized by gyroscopes.

Another advantage of the invention is that the camera is always pointed at the horses, and this is accomplished by turning the camera boom as the car enters and leaves the turns. As has been noted, the boom is further arranged so that it may be lowered for convenient access to the camera and for this purpose a positive drive is incorporated in the mounting of the boom so that the boom may be lowered or raised by an electric motor.

A further feature of the invention is the construction of the rail on which the car travels. Smooth alignment of the rail sections is assured. When it is necessary to remove a section of the rail as when a starting gate must be pulled into the infield of the track, provision is made for lowering the rail so that it is not damaged by passage of the starting gate. Further provision is made for positively locking the removed section in place after it has been restored. As has been noted, provision is likewise made for stopping the car if, through accident, the rail has been improperly placed in position.

Further objects and advantages of the present invention will become apparent upon reference to the specification and accompanying drawings in which similar characters of reference represent corresponding parts in each of the several views.

In the drawings:

Fig. 1 is a diagrammatic plan view of a race track in conjunction with which the present invention may be used.

Fig. 2 is a longitudinal vertical section of the car.

Fig. 3 is a perspective of a monorail section.

Fig. 4 is an elevation of a portion of the movable and stationary rail locking mechanism.

Fig. 5 is a top plan of a movable rail section and portions of stationary sections.

Fig. 6 is an end elevation of a movable rail section, shown in two positions.

Fig. 7 is a fragmentary portion of the rail supporting structure.

Fig. 8 is a transverse vertical section of the car.

Fig. 9 is an enlarged view of an idler wheel mounting.

Fig. 10 is a view of the side of the car showing the mounting of all four wheels, this view being partly broken away.

Fig. 11 is a transverse vertical section through the boom mounting structure.

Fig. 12 is an elevation of the boom mounting structure.

Fig. 13 is a transverse horizontal section through the boom, taken along the line 13—13 of Fig. 17.

Fig. 14 is an enlarged view of an arcuate guide for the boom elevating and lowering structure showing the shaft which turns the boom in a position whereby the camera fully overhangs the track.

Fig. 15 is a view similar to Fig. 14 showing the shaft in position when the camera is directed tangentially about a turn.

Fig. 16 is a view similar to Fig. 14 showing the shaft in position whereby the camera overhangs the infield and the boom is about one-half way down.

Fig. 17 is a side elevation of the car and showing the boom and camera mounting structure.

Fig. 18 is an end elevation of the structure of Fig. 17.

Fig. 19 is a detail of an emergency stop switch actuating cam and associated mechanism mounted on the rail.

Fig. 20 is a top plan of the camera and mounting.

Fig. 21 is a section taken along line 21—21 of Fig. 20.

Fig. 22 is a block diagram of the electronic control components.

Fig. 24 is an end elevation of the structure of Fig. 9.

Fig. 25 is an elevation of the switch, located on a stationary rail section which is closed only when the movable rail section is accurately in place, together with associated structure.

Fig. 26 is a top plan showing the limit and interlock switches relating to boom rotation.

Fig. 27 is an elevation showing interlock and limit switches relating to boom elevation and lowering.

Figure 23:
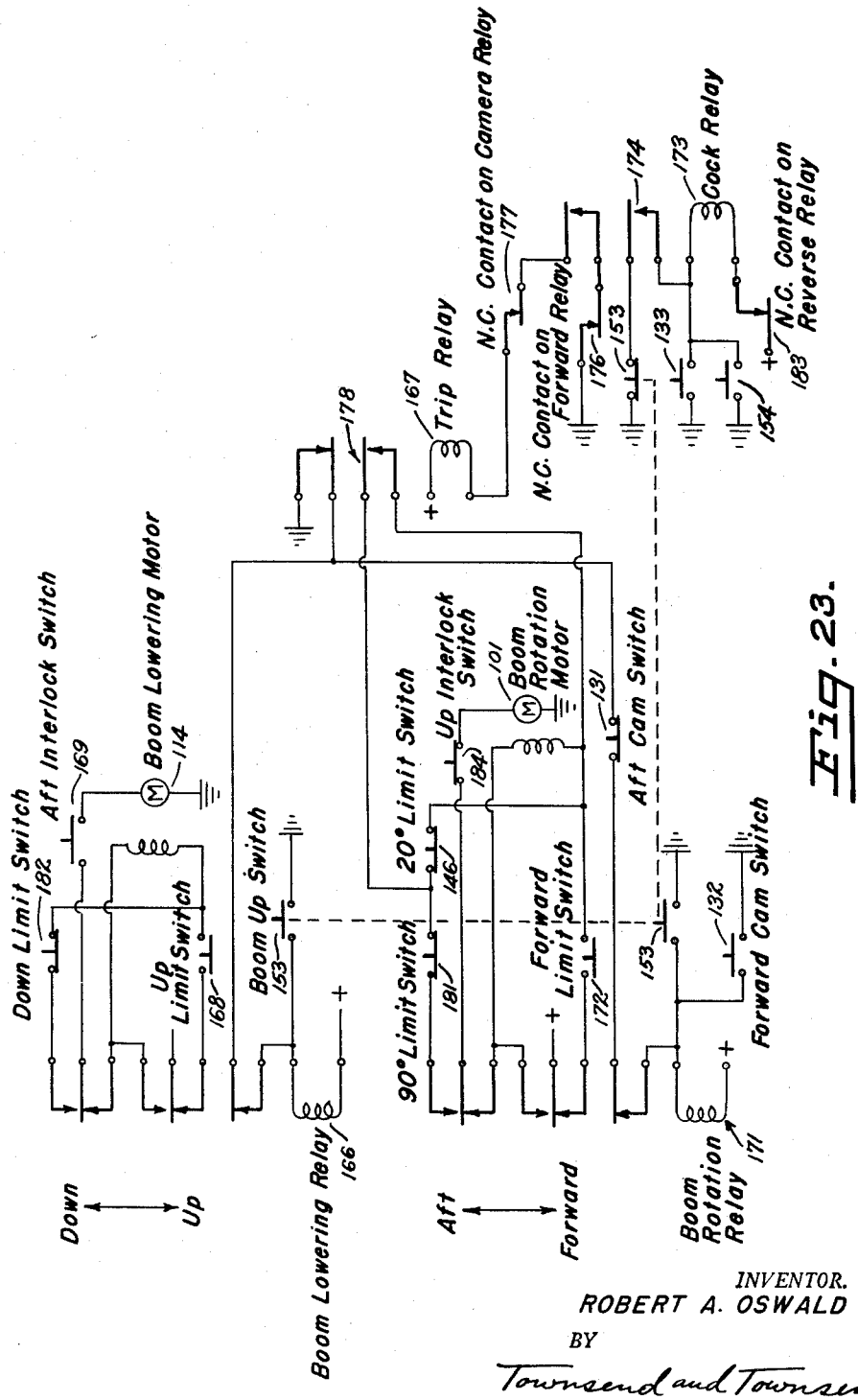
Fig. 23 is a wiring diagram of the boom control circuits.

The present invention is concerned with means and method of photographing racing events from a moving car which precedes the contestants as they run around the track. For purposes of this specification the invention will be described adapted to use in a horse race track. In the preferred embodiment hereinafter described a motion picture camera is mounted on a boom elevated above the level of the track and overhanging the same so that the angle of the picture is from in front of and above the horses; this angle of view provides the most satisfactory pictures for the purposes intended, but it will be understood that the car might be made to follow rather than precede the horses and that the angle of view is a matter of choice. Further, it will be understood that the motion picture camera of the present invention might be replaced with a television camera.

For convenience the description of the present invention will be divided into sections.

The rail

The car 20 on which the camera 21 is mounted travels on a monorail 22 which is preferably located parallel to and about two feet within the infield rail 23 of the race track 24. This location reduces danger of injury to jockeys who ordinarily crawl under the infield rail to escape injury after spills, yet places the camera close to the action of the race. The conventional race track comprises two straight portions 26 and two turn portions 27 connecting the straight portions. (See Fig. 1.) The infield rail 23 surrounds the infield and closes off one side of the racing course. The car rail 22 might be fastened to the infield fence 23, but since it has been found that sections of such fence frequently are out of alignment, a separate support means is employed in the preferred embodiment of the invention illustrated herein. Horses ordinarily are started with the assistance of a starting gate 28 having a plurality of stalls for the horses. When the start of the race occurs at a point other than in a chute 29, it is necessary to position the starting gate 28 at some point along the straight-away and then move the gate out of the way of the horses before they complete a lap of the track. This is accomplished by removing a section of the infield rail 23 and then drawing the starting gate into the infield. Accordingly, the present invention contemplates rapidly removing the adjacent section of monorail 22 from its normal position so as to permit passage of the starting gate into the infield and then replacement of the monorail so that the passage of the car is not interrupted.

The monorail 22 consists of horizontally disposed sections of wooden planks 31 of even width. The upper and lower edges of the planks are bevelled and the central portions 33 of the upper and lower edges are concaved for the reception of a top 34 and a bottom track 36. Such tracks may consist of sections of hollow tubing fitted into the concaved portions 33 of the planks 31. The sections of tubing are joined together by insertion in the abutting ends of bridging plugs 37 which eliminate the necessity of threaded connections. Preferably, the joints in the lower tube coincide with the joints in the planks so as to simplify installation.

The planks 31 are attached to upright pipes 38 the lower ends of which are buried in the ground. U-bolts 39 pass around the pipes 38 and the legs thereof extend through holes in the planks. A spacer 41 may be interposed between the plank 31 and the pipe 38. Nuts 42 on the threaded ends of the U-bolts 39 are employed to draw the planks 31 snugly against the spacer 41. (See Fig. 7.)

At the various locations where the starting gate 28 must be moved through the infield fence 23, provision is made for breaking the monorail. The pipes 38ª adjacent such positions are hinged by hinge 43 at ground level so that the rail may be bent inward into a trench 44. (See Figs. 5 and 6.) The monorail may thus be folded below ground level into the trench. A cover plate 46 between the monorail 22 and pipes 38ª fits into a step 47 near the top of the trench 44 and covers over the trench when the monorail is folded thereinto. (See Fig. 6.)

Provision is made for locking the foldable portions of the monorail 22 into alignment with the stationary portions by means of a taper pin 48 which fits within tapered sockets carried by the permanent rail section and a hole 51 in cover 46. Contact switch 53 is carried by the stationary section and a plate 54 on the movable section so that if the monorail 22 is properly connected plate 54 will close switch 53, but if the adjoining rail sections are not properly in place switch 53 will not be closed and the car 20 will be stopped and prevented from running off the rail. The latter feature will be hereinafter described in greater detail. (See Fig. 25.)

*The car*

The car 20 which travels on the monorail 23 has a streamlined casing 56 and is made throughout of light-weight material such as magnesium. Its speed and direction of movement are remote-controlled; however, the preferred embodiment described herein employs a self-contained power unit consisting of a battery 57 carried by the car and an electric motor 58 which drives a traction wheel 59 engaging the monorail 22. It will be understood that other traction means might be employed.

The car 20 employs one traction wheel 59 located at the front of the car and engaging the top of the monorail 22 and three idler wheels 61 which stabilize the car on the track. The traction wheel 59 and the upper rear idler wheels 61 are rotatably fixed to the car, but the front and rear lower idler wheels 61 are pivotally mounted to the car and spring-biased to insure constant engagement of the upper wheels with the monorail. Each wheel consists of a hub 62 and parallel annular flanges 63. The space between the flanges contains a rubber contact surface 64 so as to deaden vibration. In cross section, the rubber portions are grooved out in the form of a shallow, truncated V 66. This insures that the rubber contact surfaces ride on the tracks 34 and 36 and said tracks are constantly urged toward the bottom of the V 66. Idler wheels 61 are mounted on stub shafts 67 with ball bearings 68 between the shafts 67 and the hubs 62. The drive shaft 69 is directly mounted on the hub 62 of the traction wheel 59 and connected to motor 58. Each shaft 67 and 69 projects inward from the casing 56, and a cover plate 71 encloses each of the wheels 59 and 61. Said cover plate is held by screws against projections 70 extending from the casing 56 of the car. The lower idler wheels 61 are pivotally connected to the car. The shafts 67 are fixed to idler wheel housings 72. Said housings are connected to the car by pivot 73 which is fixed in the side of the casing 56 and is provided with an enlarged head and washer 74 which hold the housing 72 against the side of the car. An arcuate slot 76 having its center of curvature at pivot 73 is provided at a point remote from said pivot. A bolt 77 passes through this slot and its enlarged head also bears against the housing and cooperates with pivot head 74 in holding the housing against the side of the car. It will be apparent that the housing may rock with respect to the car about the pivot 73. The stub shaft 67 for the lower idler wheel is mounted intermediate the pivot 73 and slot 76, and hence the idler wheel is pivotally mounted with respect to the car. A pillow block 78 is fixed to the car and receives a pair of springs 79, the opposite ends of which bear against a boss 81 on the housing and bias the housing upwardly with the pivot 73 as a center of rotation. Thus, the springs 79 force the lower idler wheels 61 tightly against the underside of the monorail 22, and the upper idler wheels 59 and 61 are thus kept in constant engagement with the monorail. This mounting of the idler wheels 61 dampens vibrations, compensates for any possible unevenness in width or alignment of the planks 31 and insures proper traction of drive wheel 59.

A reversible, series, D. C. electric motor 58 is connected to drive shaft 69. Said motor is driven by batteries 57 carried by the car. It is intended that such motor preferably be reversible and subject to accurate speed control so as to move at the same speed as the horses. The controls to accomplish such functions are hereinafter described.

Camera boom

Mounted on the car is a camera boom 86 which projects up through an aperture 87 in the top of casing 56. The boom 86 extends vertically upward from the car to an elevation of about twelve feet above the track 24, then arches out over the track so as to overhang the infield rail 23 by about three feet. A motion picture camera 21 is fixed to a platform 88 carried by the boom and the line of sight of the camera 21 is such that it photographs horses travelling about one hundred fifty feet to the rear of the camera. As previously set forth, the camera boom 86 may be lowered for loading and unloading the camera, but in normal operation the boom is upright. Further, on turns 27 the boom may be rotated, but in normal operation on the straightaway 26 the camera extends directly outward from the car in a direction normal to the track. Thus, the boom is subject to two movements: one to lower the boom and the other to rotate the boom. Rotation of the boom is utilized so that the camera is directed tangentially about turns 27 in the track and also, as a safety feature, to insure that the camera does not overhang the track while the boom is being lowered.

The shape of the boom in cross-section is streamlined, as indicated in Fig. 13, throughout that portion of its length which extends above the casing 56. Interiorly of the casing, the boom is rotatably mounted upon bracket 91, there being a wide flange 92 on the end of the boom and a corresponding wide flange 93 on the bracket with a bearing 94 interposed between the opposed faces of flanges 92 and 93 so that the boom may be rotated with respect to the bracket 91. Rotation is accomplished by shaft 96 which is fixed to the lower end of the boom and journalled in web 97 and flange 98 of bracket 91. Shaft 96 carries a worm wheel 98 which is engaged by worm 99. Worm 99 is likewise mounted on bracket 91 but with its axis perpendicular to shaft 96. Worm 99 may be caused to revolve in either direction by reversible electric motor 101 mounted on bracket 91 and connected to worm 99. Thus, the boom 86 is given its rotative movement by operation of motor 101.

Bracket 91 is pivotally mounted to the side of the car 20. Pivot 102, fixed to the side of the car, projects interiorly thereof and said pivot is received in a journal bearing in said bracket. Washers 103 fitting over pivot 102 are disposed on opposite sides of bracket 91, and the entire mounting is held in position by cap 104 held on the inner end of pivot 102. It is apparent, therefore, that the bracket 91 (and with it boom 86) may be caused to pivot in a plane parallel to the side of the car—i. e., normal to the axis of said pivot. The lower end of bracket 91 broadens out in a flat plate 106 the edge of which is engaged within a groove 107 in the arcuate brace 108 fixed to the side of the car. (See Fig. 11.) Since the center of curvature of the brace 108 is the axis of the pivot 102, the brace holds the bracket and boom so that they pivot parallel to the side of the car and do not come out of alignment. Arcuate guide 109 fixed to the side of the car likewise cooperates in holding the bracket and boom in proper alignment, the center of curvature of said guide likewise being the axis of pivot 102. The shaft 96 carries an arm 116 which carries a cam roller 117. The guide is provided with a slot 111 within which the shaft 96 and cam roller 117 may move as the boom is raised and lowered. The width of said slot in the upper region of the guide is only slightly greater than the width of the shaft. Thus, the boom may only be lowered when the shaft is turned in a position such that the boom extends at right angles to the car and directed inwardly of the infield. Hence the boom cannot be lowered in such position as to interfere with the passage of horses or jockeys along the track. In Figs. 14 to 16 there are shown three positions of shaft 96. In Fig. 14 the shaft is shown in straightaway position with the boom overhanging the track. In Fig. 15 the boom is rotated about 20° as in the turns 27. In Fig. 16 the boom is rotated to overhang the infield, and the boom may thus be lowered.

The inner face of arcuate brace 108 bears an arcuate rack 112 which is engaged by pinion 113 driven by reversible, series, D. C. electric motor 114 mounted on bracket 91. Thus, the motor 114 controls pivoting of the boom 86 about pivot 102. When it is desired to lower the boom for loading and reloading of the camera, the pinion 113 is rotated by motor 114 thus causing the boom to swing down with the pivot as a center. As has been stated, this can only be accomplished when boom 86 is turned so that it does not overhang the track 24.

A cable 118 is fixed to the plate 106 and reeved over pulleys 119 and connected to one end of spring 120, the opposite end of said spring being fixed to the car. The force of said spring tends to overcome the weight of the boom 86 and lessen the load on motor 114.

Camera platform and camera

Boom 86 is curved in its upper region as indicated by reference numeral 121 and terminates in a flange 122. A mounting frame 123 is bolted to said flange. Said frame is horizontally disposed when the boom is erect and carries a camera platform 88. Said platform is shock mounted on said frame by mountings 126 which absorb most of the vibration of boom 86. The platform 88 carries two gyroscopes 127 and 128, the axis of gyroscope 127 being vertical and that of 128 being horizontal and parallel to the direction of movement of the car. The gyroscopes stabilize the camera platform and absorb vibrations which might interfere with proper photography. The gyroscopes are electrically driven and are preferably arranged to be energized whenever the car 20 moves in a forward direction.

Camera 21 is mounted on platform 88 and is electrically driven by motor 129 so as to stop and start by remote-control, as hereinafter described. Said camera preferably has a wide angle lens focused at 50 feet to infinity.

Car-and-rail contact controls

Projecting toward the planks 31 from the side of the car 20 and outwardly of casing 56 are four micro-switch contacts 131, 132, 133 and 134, preferably of the type having rollers at their outer extremities. Said four switches are located at four different elevations. Spaced at certain positions about the track are cams 136—141 which may be brought into contact with the micro-switch contacts 131—134 to originate certain operations in the device. It will be understood that one or more cams 136—141 are located at each of the four elevations of the switches 131—134.

Thus, adjacent the entrance of each turn is the upper cam 136 which actuates upper switch 131. Said cam 136 is stationary and each time the car 20 passes said cam the switch 131 energizes a circuit which causes motor 101 to rotate worm 99 and thus rotate the boom 86 so that the camera 21 is directed tangentially with respect to the turn 27 of the track 24, thus insuring that the camera 21 mounted on the boom 86 is directed at the horses as they round the turn. The said circuit is deenergized to stop the motor 101 after the boom 86 has swung through a predetermined number of degrees. It will be understood that the number of degrees of movement required varies depending upon the particular race track on which the car operates, and a limit switch 146 may be adjusted to stop rotation at the desired number of degrees.

The next set of cams 137 is located adjacent the end of each turn 27. Said cams 137 actuate the second micro-switch 132 each time the car passes and energizes a circuit which restores the boom 86 to straightaway position by rotating the worm wheel 98 back through the same number of degrees as previously rotated upon switch 131 contacting cam 136. The third cam 138 engages the third or cocking switch 133. Said cam 138 is preferably located just beyond the finish line 147. Switch 133 is arranged to lower the boom 86 by energizing the electric motor 114 and causing the pinion 113 to move around the rack 112 and pivot the boom 86 about pivot 102. However, the circuit arrangement is so designed that the boom 86 is lowered after cam 138 contacts switch 133 only after the motor 58 which drives the car and the motor 129 which drives the camera 21 are both off, and the boom is rotated to extend over the infield. The reason for this particular circuit arrangement is that the boom 86 should not be lowered during progress of a race but only after the finish thereof. After the finish, both the camera and car motors are off and the circuit is so arranged that the cam 138 will only lower the boom when this situation occurs. Prior to lowering the boom this switch circuit is arranged to energize motor 101 to rotate the boom 86 to overhang the infield.

Various emergency cams 139 are located about the track. Said emergency cams 139 normally are held out of engagement with the fourth micro-switch contact 134 by reason of the attachment of said cams to the armatures of solenoids 148. However, when the solenoids are not energized, the cams 139 project and contact switch 134 which stops the movement of the car 20. Some of said solenoids may be de-energized by a switch controlled by the operator in control room 149. Other solenoids 151 may be de-energized when a section of rail 22 is removed and not properly replaced, thus preventing derailment of the car. Thus, switches 53 are placed on stationary sections of rail and closed by plates 54 on removable rail sections. Contact of switch 53 is broken when a rail section is folded down or not properly replaced thus projecting cam 141 and stopping the car.

*Manual boom control*

In order to raise the boom 86 after the camera 21 is loaded, a switch 153 is provided located at a convenient point on the exterior of the casing 56. Manual actuation of said switch energizes a circuit which starts motor 114 and thus raises the boom, then energizes motor 101 which turns the boom 86 to a position overhanging the track in operative position.

Provision is likewise made for lowering the boom by means independent of cam 138 when it is desired to do so. A second switch 154 is located at a convenient point on the exterior of the car. Manual actuation of this switch energizes a circuit which starts motor 101 and rotates the boom 86 about 90° so as to overhang the infield, then energizes motor 114 which lowers the boom.

*Remote control—car movement*

The controls heretofore described have been actuated by contact switches 131—134. It is desired that the movement of the car 20 and starting and stopping of the camera 21 be controlled by an operator located at a control room 149 such as at the top of the grandstand or some similar post giving maximum visibility. It is contemplated that such remote control be accomplished by frequency modulated radio transmitter 156 and receiver 157 located at the control room and car respectively. However, other methods of control might be employed, such as carrier control or direct connection.

Basically, there are two electrical systems in the car, one the remote control circuits and the other the manual and automatic circuits. These systems remain independent except for one function which will be described in detail hereinafter.

The remote control circuits (see Fig. 22) consist of an FM receiver 157, tone selective networks 158, primary relays 159, control relays 161 and the various motors and contactors controlled thereby.

The control signals, picked up by the FM receiver 157, consist of any one of nine (9) audio tones impressed on the FM carrier. Said receiver derives its primary power from battery 157a. After demodulation these tones appear as an audio output which is connected to the tone selective networks 158. Each network is tuned to a different audio tone or control signal. Whenever the proper tone is impressed on a network it will respond by actuating a primary relay 159 associated with it as an integral part. The primary relay in turn actuates its associated control relay 161 which initiates the desired function. It will be understood that batteries 157a furnish power for all electric power and circuits except main drive motor 58 which is energized by other batteries 57.

The functions which may be initiated by the nine (9) control signals are as follows:

1. *"Forward."*—Closes the main drive contactors 162 in such a combination that the main drive motor 58 runs in a forward direction. Also energizes the camera gyroscopes 127 and 128.

2. *"Reverse."*—Closes the main drive contactors 162 in such a combination that the main drive motor 58 runs in a reverse direction. Camera gyroscopes 127 and 128 do not operate in the reverse direction.

3. *"Run."*—For the duration of this control signal, the main drive motor 28 is connected directly across the main drive battery 27. This provides for rapid acceleration. As soon as the control signal has ceased, the main drive motor 28 is connected in series with the speed control 163. Actually these two functions occur simultaneously but the acceleration function may be initiated at any time by sending the "run" control signal.

4. *"Idle."*—Inserts a fixed amount of resistance in series with the speed control 163. This causes the car to run at a slow or "idling" speed. This is the condition which exists at the time either the "forward" or "reverse" functions are initiated. In other words, the car always starts in either direction at the "idling" speed.

5. *"Fast."*—For the duration of this control signal, a small motor 164 is caused to operate within the speed control 163 in such a manner that the resistance in series with the main drive motor 58 is reduced, thereby causing it to run faster.

6. *"Slow."*—For the duration of this control signal, small motor 164 is caused to operate within the speed control 163 in such a manner that the resistance in series with the main drive motor 58 is increased, thereby causing it to run slower.

7. *"Stop."*—This function causes the main drive contactors 162 to open, thereby deenergizing the main drive motor 58. Also the "idle-run" circuit is restored to the "idle" condition. Occurring simultaneously and continuing for the duration of the stop control signal, the main drive motor 58 is connected, through the main drive contactors, as a series generator with a very low resistance load. This causes a drag to be placed against the motion of the car and, therefore, acts as a dynamic brake.

8. *"Camera on."*—This function energizes the camera motor.

9. *"Camera off."*—This function deenergizes the camera motor.

The circuits whereby the manual and automatic functions are accomplished will be described by reference to wiring diagram Fig. 23 which has been drawn in accordance with the following conditions which will be used as the starting point of this description:

1. Camera boom 86 is elevated (vertical) and has been rotated to the forward (0 degrees) position.
2. Camera motor 129 is energized.
3. Car 20 is in forward motion on a straightaway 26.

Relay 166 is in its energized condition. This relay is wired so as to maintain itself in an energized condition. The hold circuit is completed through the normally closed contacts of relay 167. The energizing of relay 166 has caused the camera boom 86 to rise to its vertical position through the operation of motor 114 which has been deenergized by the action of switch 168. This switch 168 is actuated mechanically by the boom mechanism when it has assumed a vertical position. Motor 114 is further disabled by switch 168 which has been allowed to open as a result of the camera boom having rotated away from its 90 degree position.

Boom rotation relay 171 is in its energized condition. This relay is wired so as to maintain itself in an energized condition. The hold circuit is completed through a pair of contacts on the relay 171, switch 131 and the normally closed contacts of relay 167. The energizing of relay 171 has caused the boom to rotate to its forward (0 degrees) position through the operation of motor 191 which has been deenergized by the action of switch 172. This switch is actuated mechanically when the boom has rotated to its forward position.

Slightly in advance of the beginning of each turn a fixed cam 136 is located on the rail in such a position that switch 131 is actuated as the car passes. This action deenergizes the relay 171 and motor 191 then rotates the boom in an "aft" direction until switch 146 is actuated. This action is necessary in order that the camera 21, located at the end of the boom 86, may continue to point in the direction of the horses when both the horses and the car 20 are in a turn 27.

Just in advance of the end of each turn 27 fixed cam 137 is located in such a position that switch 132 is actuated as the car passes. This action energizes relay 171 and motor 191 rotates in the opposite direction, bringing the boom 86 to its forward position at which time switch 172 is again actuated.

Located just beyond the finish line is a fixed cam 138 which is so placed that switch 133 is actuated as the car passes. This action energizes relay 173 which is wired so as to maintain itself in the energized condition. The hold circuit is completed through a pair of contacts on relay 173 and a pair of contacts on switch 153. When relay 173 is energized it also closes contact 174 which is one of three pairs of contacts in series with the coil of relay 167. The other two pairs of contacts 176 and 177 are located on the forward control relay and camera control relay, respectively, and are open whenever these relays are energized. When these two relays are deenergized—i. e., the "stop" and "camera off" functions have been initiated, these two pairs of contacts are closed and in series with the already closed contacts 174 of relay 173, complete the circuit for the coil of relay 167. When relay 167 is energized the hold circuits for both relay 171 and relay 166 are broken and they are deenergized. An additional pair of contacts 178 on relay 167 shorts out switch 146. When relay 171 is deenergized, motor 191 is energized and causes the boom 86 to rotate in the "aft" direction until switch 181 has been actuated. This is possible because switch 146 has been shorted out by the action of relay 167. When relay 166 is deenergized, circuits are established which will cause motor 114 to lower the boom when switch 169 has been actuated as a result of the camera boom rotating to the 90 degree position. When the boom has reached the "down" position, switch 182 is actuated and motor 114 stops. The conditions which now exist are as follows:

1. Car 20 is at rest.
2. Camera motor 129 is deenergized.
3. Camera boom 86 is in the "down" position.

If only the "stop" function is initiated after relay 173 and relay 167 have been energized, the car will come to a stop with the camera motor 129 still in operation. Therefore, the camera boom will not be lowered automatically. If the car is then caused to run in the reverse direction, relay 173 will be deenergized since part of the hold circuit is completed through a pair of normally closed contacts 183 on the reverse control relay. This pair of contacts 183 is so located that relay 173 cannot be reenergized as long as the reverse control relay is energized. Therefore, the car may be backed even across the finish line 147, stopped, and the camera motor 129 deenergized without the camera boom 86 being automatically lowered.

When it is desired to raise the camera boom 86, switch 153 must be operated manually. This switch energizes relay 166 and relay 171 and deenergizes relay 173 which in turn deenergizes relay 167 which then reestablishes the hold circuits for relay 166 and relay 171.

When relay 166 is energized motor 114 is caused to rotate in a direction to raise the camera boom 86. Upon reaching the vertical position switch 168 is actuated and motor 114 stops.

When relay 171 is energized circuits are established which will cause the camera boom 86 to rotate in a forward direction. This cannot occur until the boom is in the vertical position at which time switch 184 is actuated which energizes motor 101 causing the boom to be rotated to the forward position.

Should it be desired to lower the camera boom manually switch 154 may be actuated. This action energizes relay 173 and if the conditions are correct—i. e., car is at rest and the camera motor deenergized, the camera boom will be lowered as previously described.

The various limit switches and interlock switches heretofore described are located and actuated as follows: Immediately beneath the flange 93 on bracket 91 is an arcuate annular plate 191 fastened to the side of the car having a radius somewhat larger than that of flange 93. Switches 146, 172, 169 and 181 are mounted on said plate 191 and are contacted by two contacts 192 and 193 fixed to flange 92 connected to boom 86. (See Fig. 26.) The contacts 192 and 193 are at two different elevations so that each contacts only certain switches. Limit switch 146 is made adjustable in that it is attached to plate 191 by means of screws passing through an arcuate slot 194 and hence may be adjusted to stop rotation of the boom on turns of the track after any predetermined number of degrees of rotation of the boom, depending upon the contour of the particular track. The other switches 172, 169 and 181 are fixed to plate 191. Switches 146 and 169 are at a higher elevation and are contacted by contact 192, which is also at the higher elevation.

In Fig. 27 are shown the location of switches 182, 168 and 184, which are actuated by pivotal movement of bracket 91. The last-named switches are mounted on the side of the car immediately above the arcuate brace 108. Said brace 108 carries a plate 196 on the lower end thereof on the forward side. Said plate is arranged to contact switch 182 when the boom is in down position. Switches 168 and 184 are adjacent the opposite end of brace 108 and are contacted by adjustable screws 197 carried by bracket 91; screws 197 are so adjusted as to actuate switches 168 and 184 when the boom is in upright position.

*Remote control—camera*

It is desirable that the camera motor 129 be turned on only during the interval while a race is in progress so that film is used only during that period, thus economizing in the amount of film used.

For such purpose a remote control is provided to start the camera motor 129 just before the start of a race and stop the camera just after the conclusion of the race.

*Operation*

In order to illustrate the method or system of recording racing events and the objects and advantages of the means heretofore disclosed, a description of the operation from start to finish of a race will be set forth.

It will be assumed that the camera 21 has been loaded with film, the boom 86 is erect and the car 20 has been moved around the track to a position about 150 feet ahead of the starting gate 28. It will further be assumed that the start of the particular race occurs at a point along the straightaway 26, thus necessitating removal of a section of the rail 22 to accommodate the starting gate 28. Therefore, the rail 22 has been folded down at this point so that the position thereof is as illustrated in full lines in Fig. 6. Just prior to the start, the operator in his control booth 149 presses the "forward" signal key which operates the controls which start the car forward at idle speed so as partially to overcome inertia before the start. The gyroscopes 127 and 128 revolve when the drive motor 58 is in forward operation. The operator also presses the "camera start" key which starts the camera motor 129 in operation.

When the starter starts the race by opening the gates 28, the operator presses the "run" signal which rapidly accelerates the car to the speed of the horses by putting the motor directly across the battery 57 and locks a relay which upon release of the "run" signal drops the motor back on variable speed control.

The speed of the car is regulated so that it is approximately 150 feet in advance of the horses. If there has been a false start and the horses are called back to their stalls, then the operator may press the "camera stop" key to stop the camera motor 129, then press the "stop" key to stop the car, then press the "reverse" key to reverse the field of the drive motor 58 and reverse the car to its starting position in time for the next start.

The operator may cut the speed down to idle at any time by pressing "idle" without first pressing "stop." By actuation of the "fast" or "slow" key the operator may decrease or increase the resistance 163 in series with the field of the drive motor 58 and thus increase or decrease the speed of the motor.

With the race in progress and the car proceeding at or about the same speed as the horses, subject to the speed control of the operator, the car approaches the first turn 27. It is necessary to turn the boom 86 so that the camera 21 is pointed in the direction of the horses, preferably approximately at a tangent to the curvature of the infield rail 23. Turning of the boom 86 is automatically controlled by the cam 136 engaging switch contact 131. This starts the motor 101 which operates a sufficient length of time to turn the boom 86 through the required number of degrees to keep the camera 21 at the preferred tangential position, whereupon a limit switch 146 stops motor 101. The number of degrees will vary from track to track depending upon the contour thereof. It has been found that it is desirable that the motor 101 turn the boom through 20° in 4 seconds. By this time the horses have just reached the turn, assuming their speed to be 40 feet per second.

When the car reaches the end of the turn, cam 137 contacts switch 132 and this reverses motor 101 and the boom 86 is restored to straightaway position, whereupon limit switch 172 stops motor 101. The same turning and returning of the boom 86 is accomplished at the second turn 27.

By the time the car has traversed the two turns 27, the starting gate 28 should have been moved into the infield and the rail 22 restored to position. The rail 22 is folded upward to upright position shown in dot and dash lines in Fig. 6 and locked in such position by taper pins 48 placed in the corresponding sockets on the foldable and permanently-upright monorail sections. If the rail 22 is in proper position, switch 53 operates to retract the cam 141 located slightly ahead of the starting position and permit the car to pass over the recently restored section of rail. If, by accident, the rail is improperly restored in position, then the cam 141 is not retracted and hence contacts switch 134 and stops the car immediately so that it is not derailed. It will be understood that the operator may actuate any of the emergency cams 139 located at various points about the track to contact switch 134 and stop the car in case of emergency.

After the horses cross the finish wire 147, cam 138 strikes cocking switch 133. The operator presses the "camera stop" key to stop the camera motor 112. The car motor 58 is shut off by remote control just prior to the car 20 reaching a location adjacent the film processing laboratory and dynamically braked to a halt. After the car passes the cocking cam 138 if the camera motor 129 and car motor 58 are both turned off, a circuit is energized which will turn on motor 101 to turn the boom 86 to overhang the infield and then energize motor 114 to lower the boom for convenient access to the camera so that the attendant may unload the exposed film for processing and load for the next race. After the camera 21 is reloaded, the attendant pushes switch 153 which raises the boom 86 in position for the next race. If, for any reason, it is desired to lower the boom 86 before the end of the next race, the attendant may press switch 154, which accomplishes that result.

The film which has been exposed is then taken to the processing laboratory and developed and projected upon a screen for viewing by racing officials. The details of these operations form no part of this invention.

Although I have described my invention in some detail by way of illustration and example for purposes of clarity of understanding, it is understood that certain changes and modifications may be made within the spirit of the invention and scope of the appended claims.

I claim:

1. A carrier adapted to advance a camera about a race course by suspension from a support extending about said race course comprising, a motor mounted in said carrier, a traction wheel driven by said motor and arranged to engage said support, first means for starting and stopping said motor, a camera support on which said camera may be mounted, a bracket pivotally mounted in said carrier, said camera support being rotatably mounted on said bracket, a shaft fixed to said camera support and journalled in said bracket, an arcuate guide fixed to said carrier and receiving an edge of said bracket, means carried by said bracket for revolving said shaft and said camera support, and second means for rotating said bracket about its pivot.

2. A carrier adapted to advance a camera about a race course by suspension from a support extending about said race course comprising, a motor mounted in said carrier, a traction wheel driven by said motor and arranged to engage said support, first means for starting and stopping said motor, a camera support on which said camera may be mounted, a bracket pivotally mounted in said carrier, said camera support being rotatably mounted on said bracket, a shaft fixed to said camera support and journalled in said bracket, and having a flattened portion, a second arcuate guide fixed to said carrier and receiving the flattened portion of said shaft, said second guide having a slot therein, one portion of said slot being dimensioned to receive said shaft only when said camera support overhangs an area removed from said course and a second portion of said slot being positioned to receive said shaft when said camera support overhangs said course.

3. A system of obtaining a continuous photographic record of contestants in a race from start to finish around a course having arcuate and straight-away portions comprising a camera, a carrier on which said camera is mounted moving about the course and parallel thereto, a stationary actuator located adjacent said course proximate the end of an arcuate portion, a switch on said carrier actuated by said stationary actuator upon said carrier passing said actuator, a motor energized upon actuation of said switch, means driven by said motor for turning said camera to photograph contestants in a race continuously in the arcuate and straight-away turn portions, and a limit switch on said carrier operable to de-energize said motor after said camera has turned through a pre-selected angular travel.

4. A system as defined in claim 3 and including an emergency stop manually operable to project into the path of said carrier, a switch on said carrier engageable with said stop when in projected position, and means actuated by said switch operable to stop movement of said carrier.

5. A system of obtaining a continuous photographic record of contestants in a race from start to finish around a course by means of a camera mounted on a carrier moving on a rail, a portion of which rail is removable comprising, a first switch closed only when said removable portion is properly in place with respect to said stationary portion, a stop movable to active and inactive positions, said stop being movable to inactive position only when said first switch is closed and when said removable and stationary rail portions are in alignment, a second switch on said carrier engageable with said stop when in active position, and means actuated by said second switch operable to stop movement of said carrier.

6. A system of obtaining a continuous photographic record of contestants in a race about a course having arcuate and straightaway portions comprising an elevated camera, a normally vertical support on which said camera is mounted, a carrier movable about the course on which said support is rotatably mounted, said support being arranged to be lowered for convenient access to said camera, first means for rotating said camera to a first or straightaway position, to a second or turn position and to a third position overhanging an area removed from said course, second means for lowering and raising said support, a first manual control for raising said support from lowered position, then rotating said camera to first position, and a second manual control for rotating said camera support to third position and then lowering said support.

7. A system of obtaining a continuous photographic record of contestants in a race about a course having arcuate and straightaway portions comprising an elevated camera, a normally vertical support on which said camera is mounted, a carrier movable about the course on which said support is rotatably mounted, said support being arranged to be lowered for convenient access to said camera, first means for rotating said camera to a first or straightaway position, to a second or turn position and to a third position overhanging an area removed from said course, second means for lowering and raising said support, a stationary actuator located adjacent the path of travel of said carrier, a switch arranged to be actuated upon contact with said actuator, a cocking relay actuated upon closing of said switch, first means for starting and stopping said carrier, second means for starting and stopping said camera, said cocking relay being arranged so that after closing of said switch and after said first and second means are actuated to stop said carrier and said camera, respectively, a circuit is energized, said circuit being arranged to first rotate said camera to third position and then to lower said support.

8. A system as defined in claim 7 wherein auxiliary mechanical means are positioned in said carrier to permit lowering of said support only after rotation of said camera to third position.

9. A carrier adapted to advance a camera about a race course by suspension from a support extending about said race course comprising, a motor mounted in said carrier, a traction wheel driven by said motor and arranged to engage said support, first means for starting and stopping said motor, a camera support carried by said carrier, a camera on said camera support, second means for rotating said camera support about an axis normally vertically disposed, third means for raising and lowering said camera support, a cam rotatable with said camera support when said camera support rotates about said axis normally vertically disposed and movable with said camera support when said camera support raises and lowers, and a guide mounted on said carrier and receiving said cam, said guide and cam being shaped to render said third means inoperative until said second means has been actuated to rotate said camera support to a position in which said camera overhangs an area removed from said course.

10. A carrier adapted to advance a camera about a race course by suspension from a support extending about said race course comprising, a first motor mounted in said carrier, a traction wheel driven by said motor and arranged to engage said support, first means for starting and stopping said motor, a camera support carried by said carrier, a camera on said camera support, a second motor arranged to rotate said camera support, second means arranged to start, stop and reverse said second motor and operative to rotate said camera support to a straightaway position, a position tangential to a turn of said race course and a position overhanging an area outside said race course, a third motor arranged to raise and lower said camera support, third means arranged to start, stop and reverse said third motor, a cam rotatable with said camera support when said camera support rotates about said vertical axis and movable with said camera support when said camera support raises and lowers, a guide mounted on said carrier and receiving said cam, said guide and cam being shaped to render said third motor inoperative until said second motor has been energized to rotate said camera support to a position in which said camera overhangs an area removed from said course.

11. A carrier as defined in claim 10 wherein said guide has a slot in which said cam may move, said slot and said cam being shaped to permit lowering of said camera support only when said camera support is in said third position.

References Cited in the file of this patent
UNITED STATES PATENTS

| Number | Name | Date |
|---|---|---|
| 1,102,172 | Sciamengo | June 30, 1914 |
| 1,351,502 | Ball | Aug. 31, 1920 |
| 1,524,277 | Schoberle | Jan. 27, 1925 |
| 1,728,576 | Schem | Sept. 17, 1929 |
| 1,801,141 | Connors | Apr. 14, 1931 |
| 1,828,672 | McFadin | Oct. 20, 1931 |
| 1,898,185 | Howell | Feb. 21, 1933 |
| 2,077,104 | Geib | Apr. 13, 1937 |
| 2,250,442 | Abell | July 29, 1941 |
| 2,299,330 | Macnabb | Oct. 20, 1942 |
| 2,348,841 | Oswald | May 16, 1944 |
| 2,382,055 | Homrighous | Aug. 14, 1945 |
| 2,382,616 | Del Riccio | Aug. 14, 1945 |
| 2,382,617 | Del Riccio | Aug. 14, 1945 |
| 2,397,539 | Dent | Apr. 2, 1946 |
| 2,408,528 | Nassour | Oct. 1, 1946 |
| 2,415,563 | Nash | Feb. 11, 1947 |
| 2,447,667 | Raby | Aug. 24, 1948 |
| 2,472,944 | Furer et al. | June 14, 1949 |
| 2,523,662 | Miller | Sept. 26, 1950 |
| 2,538,910 | Miller | Jan. 23, 1951 |
| 2,633,054 | Black | Mar. 31, 1953 |